May 9, 1950     R. T. GLEISEN     2,506,638
GRASS TRIMMER

Filed March 20, 1948     2 Sheets-Sheet 2

INVENTOR.
Richard T. Gleisen
BY

Patented May 9, 1950

2,506,638

UNITED STATES PATENT OFFICE 2,506,638

GRASS TRIMMER

Richard T. Gleisen, Teaneck, N. J.

Application March 20, 1948, Serial No. 16,012

9 Claims. (Cl. 56—246)

This invention relates to an improved grass trimmer and mower and, more particularly, to a device for trimming the edges of grass plots and lawns bordering on hard-surfaced walks, driveways and the like.

Due to the discontinuity of surface and the differential elevation occurring at the borders of grass plots and lawns where they abut hard-surfaced walks or driveways, it is frequently difficult or completely impossible properly to trim the bordering edges of such grass plots and lawns with lawn mowers of the conventional two-wheeled type having rotary or oscillating cutters.

Accordingly, it is an object of the present invention to provide an edge-trimming device for grass plots and lawns constructed and arranged in such a manner as to be readily applied along the margnial edges thereof for trimming purposes. This object is achieved by providing a device comprising a frame carrying a single driving wheel rotatable in a vertical plane, the wheel having a peripheral lateral flange formed with a continuous series of cam elements for actuating a pair of shear-blades pivoted to lower extensions of the frame for cutting action in a plane perpendicular to the plane of the driving wheel. Thus the device may be easily manipulated for its intended purpose since the single driving wheel may be easily located the proper distance inwardly of the marginal edge of the lawn being trimmed, the device being free of engagement with the adjoining hard surface and being completely supported on the lawn surface. Under certain conditions, however, it might be desirable to position the driving wheel on the hard-surfaced walk or driveway bordering the lawn at a suitable distance outwardly of the marginal edge thereof to effect proper trimming of the lawn edge by the shear-blades as the device is pushed along the hard surface. The particular method of using the device, i. e. with the driving wheel supported adjacent the marginal edge of the lawn either upon the lawn surface or upon the adjoining hard surface, will depend upon the special conditions encountered in a given case.

A further object of the invention is the provision of an edge-trimming device of the character indicated comprising a minimum number of component elements which may be easily and inexpensively fabricated and readily assembled to a simple, compact and durable unit.

Another object of the invention is the provision of an edge-trimming device wherein the cutting elements or shear-blades may be easily detached and reassembled for sharpening or grinding whenever required by the conditions of use.

The foregoing objects as well as additional objects and advantages of the invention will be readily understood in the course of the following detailed description taken in connection with the accompanying drawings which illustrate a preferred embodiment of the invention, and wherein.

Figure 1:
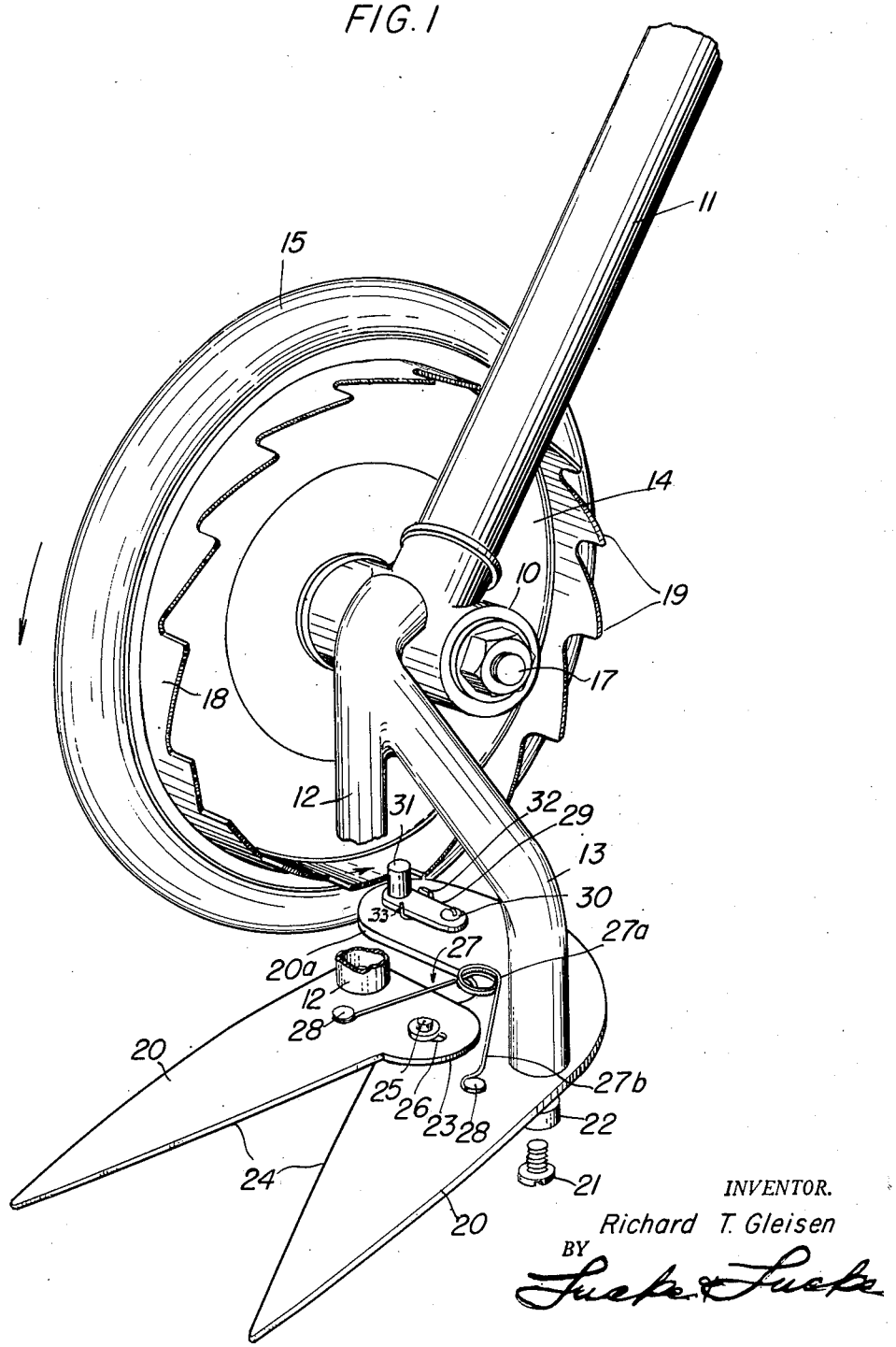
Fig. 1 is a perspective view of the device in assembled condition, one of the lower frame elements being partly broken away to show the cooperation between the peripheral cam elements of the driving wheel and the shear-blades.

Referring now to the drawings in greater detail, the frame of the device comprises a horizontal bearing portion 10, an upwardly inclined handle element 11 and a pair of depending mounting elements 12 and 13 to which the shear-blades 20 may be pivoted, as will be more fully described hereinafter. The single driving wheel 14 may be provided with a tire 15 and the hub 16 of said wheel is mounted on an axle 17 journaled in bearing portion 10.

Wheel 14 is provided adjacent the periphery thereof with a laterally extending flange 18 shaped to define a continuous series of cam elements 19. Shear-blades 20 are pivotally secured to depending frame elements 12 and 13 respectively (see Fig. 1) and are preferably detachably associated therewith as by means of a screw 21 and washer 22. As will be seen by referring to Fig. 1, the shear-blades are together displaced laterally from the wheel 14. One of the shear-blades 20 is formed with a posterior lateral extension 20a directed inwardly toward the lateral flange 18 of the wheel 14. The shear-blades 20 are further provided with overlapping ears 23 adjacent their cutting edges 24, said ears being pivotally interconnected as shown at 25.

In order to permit relative motion of the shear-blades 20 about pivot 25 and the alternate approach and separation of the cutting edges 24, one of the ears 23 is provided with an elongated slot 26 somewhat greater in width than pivot pin 25. Further, the shear-blades 20 are normally urged apart into the separated, inoperative position of Figs. 1 and 2 through the agency of spreader or spring means 27. Said spreader or spring means may take the form shown in the drawings comprising a central coil 27a and a pair of divergent arms 27b terminally secured against studs 28 of the shear-blades 20, or may take any other suitable form.

Figure 2:
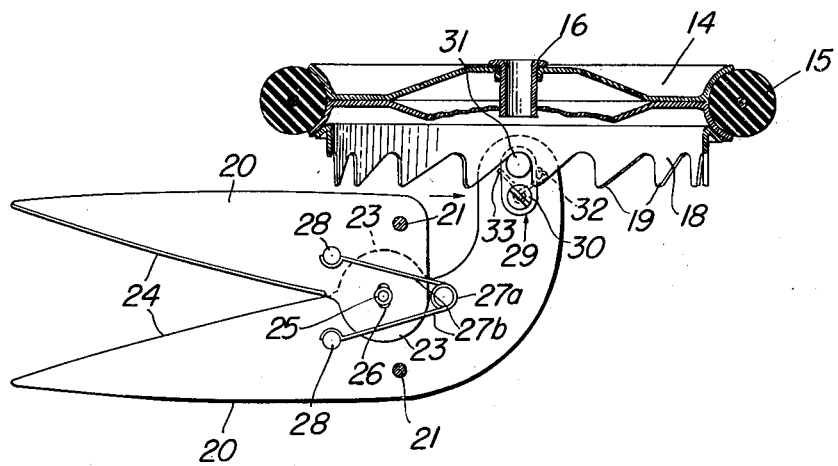
Fig. 2 is a view partly in plan and partly in section with the frame omitted for the sake of clarity and illustrates the shear-blades in their open, inoperative position.
Figure 3:
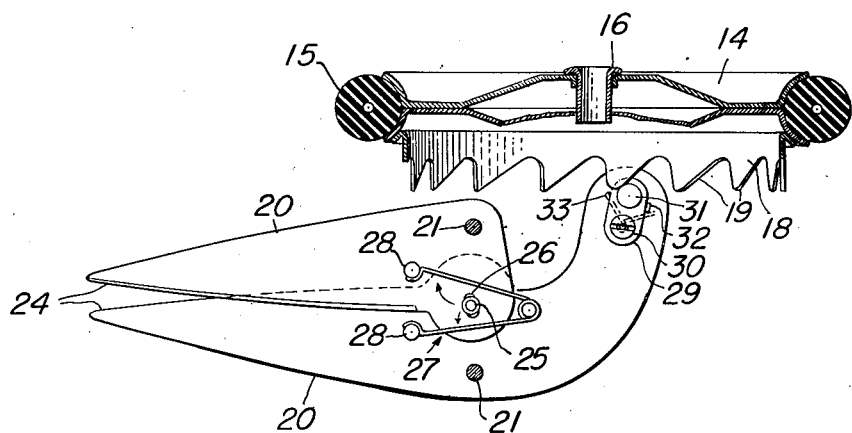
Fig. 3 is a similar view illustrating a successive stage in the operation of the device with the shear-blades in closed operative position.

Means are provided on the lateral extension 20a of one shear-blade 20 for imparting motion to the shear-blades as the driving wheel is rotated by pushing the device along the ground surface. This means preferably takes the form of an arm 29 pivoted to the lateral extension 20a as at 30 and carrying a follower element 31 successively engageable against the cam elements 19 of wheel-flange 18 as wheel 14 is caused to rotate. The arm 29 normally abuts a stop 32 on the shear-blade 20. Thus, when the device is held by means of the handle 11 and pushed forwardly to rotate wheel 14 in the direction of the arrows of Fig. 1, the follower element 31 will successively contact the low and high points of the cam elements 19, thereby causing the shear-blades 20 alternately to open and close and effect cutting of the grass received between cutting edges 24, as illustrated in Figs. 2 and 3.

The arm 29 is releasably held against the stop 32 by the action of a return spring 33 in order to allow retraction of the device and reverse motion of the wheel 14 (in a direction opposite to the arrows in Fig. 1) without causing damage to the device. Thus, as the device is retracted after a cutting stroke, the follower element 31 carried by the arm 29 will merely slip against the cam elements 19 without imparting cutting motion to the shear-blades 20. Thus, the lateral extension 20a and the arm 29 which carries the follower element 31 constitutes a form of connection between one of the shear-blades 20 and the follower.

Since certain modifications may be made in the edge-trimming device of the present invention without departing from the scope thereof, it is intended that all matter contained in the foregoing description and shown in the accompanying drawings be interpreted merely as illustrative and not in a limiting sense.

What is claimed is:

1. An edge trimmer for trimming the edges of grass plots, lawns and the like, said trimmer comprising: a handle; a frame carried by said handle at one end thereof; a driving wheel mounted on said frame at one side of said handle; a continuous series of cam elements on said wheel extending laterally therefrom in the direction of said handle; a pair or shear-blades, each pivotally secured to said frame and together displaced laterally from said wheel; a follower for making constant contact with said series of cam elements; and a connection between said follower and said shear-blades; whereby rotation of said wheel and said cam elements thereon displaces said follower laterally and with it said connection to actuate said shear-blades.

2. An edge-trimming device of the character described comprising a frame portion, a single driving wheel mounted on said frame portion, said wheel being provided with a continuous series of laterally extending cam elements, a pair of shear-blades each pivotally secured independently to said frame portion, one of said shear-blades having a lateral projection extending inwardly toward said cam elements, operating means interconnecting said cam elements with said lateral projection, said operating means including an arm pivoted to said lateral projection, a follower mounted on said arm and engageable against said cam elements, a stop on said lateral projection against which said arm normally abuts, and spring means releasably retaining said arm against said stop, whereby to effect cutting action of said shear-blades upon forward rotation of said driving wheel and to permit reverse rotation of said driving wheel.

3. An edge-trimming device in accordance with claim 1, having resilient spreader means fixed between said shear-blades and normally urging said shear-blades apart.

4. An edge-trimming device in accordance with claim 2, having resilient spreader means fixed between said shear-blades and normally urging said shear-blades apart.

5. An edge-trimming device of the character described comprising a frame portion including a substantially horizontal bearing portion, a handle element and a pair of depending frame elements, a single driving wheel rotatably supported in said bearing portion, said wheel being provided with a continuous series of laterally extending cam elements, a pair of shear-blades each pivotally secured independently at the free ends of said depending frame elements, one of said shear-blades, having a lateral projection extending toward said cam elements, operating means interconnecting said cam elements with said lateral projection, said operating means including an arm pivoted to said lateral projection, a follower mounted on said arm and engageable against said cam elements, a stop on said lateral projections against which said arm normally abuts, and spring means releasably retaining said arm against said stop, whereby to effect cutting actions of said shear-blades upon forward rotation of said driving wheel and to permit reverse rotation of said driving wheel.

6. An edge-trimming device in accordance with claim 5, having resilient spreader means fixed between said shear-blades and normally urging said shear-blades apart.

7. An edge trimmer for trimming the edges of grass plots, lawns and the like, said trimmer comprising a frame, and a driving wheel journaled at one side of said frame, in combination with a continuous series of cams on said wheel extending toward said frame, a pair of coacting shear-blades pivotally secured to said frame and displaced thereon toward its side opposite to that upon which said wheel is journaled, a follower in contact with said cams, and a connection between one of said shear-blades and said follower, whereby rotation of said wheel will effect cutting action by said shear-blades.

8. An edge trimmer for trimming the edges of grass plots, lawns and the like, said trimmer comprising a frame; said frame including a handle, a pair of depending frame elements, and a substantially horizontal bearing element; and a single driving wheel journaled upon said bearing element and positioned beyond one side of said frame; in combination with a continuous series of laterally extending cams on said wheel; a pair of coacting shear-blades, each blade being pivotally secured at the free end of one of said depending frame elements; a spring connected to said shear-blades for opening the blades; a follower in contact with said cams; and a connection between one of said shear-blades and said follower; whereby rotation of said wheel will intermittently close said blades against the resiliency of said spring and effect cutting action by said shear-blades.

9. An edge trimmer for trimming the edges of grass plots, lawns and the like, said trimmer comprising a frame; said frame including a handle, a pair of depending frame elements, and a substantially horizontal bearing element; and a single driving wheel journaled upon said bearing element and positioned beyond one side of said frame; in combination with a continuous series of laterally extending cams on said wheel; a pair of coacting shear-blades, each blade being pivotally secured at the free end of one of said depending frame elements; a spring connected to said shear-blades for opening the blades; a follower in contact with said cams; and a connection between said shear-blades and said follower; whereby rotation of said wheel will intermittently close said blades against the resiliency of said spring and effect cutting action by said shear-blades.

RICHARD T. GLEISEN.

REFERENCES CITED

The following references are of record in the file of this patent:

UNITED STATES PATENTS

| Number | Name | Date |
| --- | --- | --- |
| 1,057,015 | Stover | Mar. 25, 1913 |
| 1,860,317 | Clark | May 24, 1932 |